US012563006B2

(12) United States Patent
Sahoo et al.

(10) Patent No.: US 12,563,006 B2
(45) Date of Patent: Feb. 24, 2026

(54) SYSTEMS AND METHODS FOR GENERATING EMAILS WITH INTERACTIVE ACTIONABLE ELEMENTS

(71) Applicant: HIGHRADIUS CORPORATION, Houston, TX (US)

(72) Inventors: Dibya Prakash Sahoo, Hyderabad (IN); Abhishek Sahu, Hyderabad (IN); Liza Mohanty, Hyderabad (IN); Avik Panda, Hyderabad (IN); Ayush Kumar, Hyderabad (IN); Parsuram Panigrahi, Hyderabad (IN); Srinivas Rapaka, Hyderabad (IN)

(73) Assignee: HIGHRADIUS CORPORATION, TX (US)

( * ) Notice: Subject to any disclaimer, the term of this patent is extended or adjusted under 35 U.S.C. 154(b) by 139 days.

(21) Appl. No.: 18/399,767

(22) Filed: Dec. 29, 2023

(65) Prior Publication Data

US 2025/0219976 A1     Jul. 3, 2025

(51) Int. Cl.
*H04L 51/066*          (2022.01)

(52) U.S. Cl.
CPC .................................. *H04L 51/066* (2013.01)

(58) Field of Classification Search
CPC ....... H04L 51/066; H04L 51/42; H04L 51/18; H04L 51/063; G06Q 10/107
See application file for complete search history.

(56) References Cited

U.S. PATENT DOCUMENTS

| | | | | |
|---|---|---|---|---|
| 11,470,028 B1* | 10/2022 | Fazlyev | ............. | G06Q 30/0629 |
| 2012/0290945 A1* | 11/2012 | Byrne | ................. | G06F 3/04842 |
| | | | | 715/752 |
| 2017/0034105 A1* | 2/2017 | Beyer | ..................... | H04L 51/48 |
| 2019/0190859 A1* | 6/2019 | Sahney | ................... | H04L 51/52 |
| 2019/0190864 A1* | 6/2019 | Bastide | ................. | H04L 51/066 |
| 2020/0344188 A1* | 10/2020 | Raskin | ................. | G06F 3/0486 |
| 2022/0141167 A1* | 5/2022 | Bar-on | .................... | H04L 51/42 |
| | | | | 709/206 |
| 2023/0421523 A1* | 12/2023 | Teplow | ................. | G06Q 10/10 |

* cited by examiner

*Primary Examiner* — Johnny B Aguiar
(74) *Attorney, Agent, or Firm* — Jason C. Cameron

(57)          ABSTRACT

A computer-implemented method for generating interactive actionable electronic mails, is disclosed. The computer-implemented method includes: receiving first inputs from first electronic devices associated with first users; determining types of electronic mail wrappers based on the first inputs received from the first electronic devices; generating the electronic mail wrappers based on accelerated mobile pages (AMP), adaptive cards, and hypertext markup language (HTML) frameworks; sending the interactive actionable electronic mails including the electronic mail wrappers based on cloud-based electronic mail sending services supporting first protocols; providing an output of the interactive actionable electronic mails with the electronic mail wrappers, to the first users on user interfaces associated with the first electronic devices; and updating databases in real-time based on second inputs, in response to the interactive actionable electronic mails with the generated electronic mail wrappers, received from second electronic devices associated with second users.

17 Claims, 10 Drawing Sheets

100

104

Memory 202

Plurality of Subsystems 110

Input Receiving Subsystem 210

Electronic Mail Wrapper Generation Subsystem 212

Electronic Mail Sending Subsystem 214

Electronic Mail Rendering Subsystem 216

Output Subsystem 218

Database Updating Subsystem 220

System Bus 208

Storage Unit 206

Hardware Processor(s) 204

300

400A

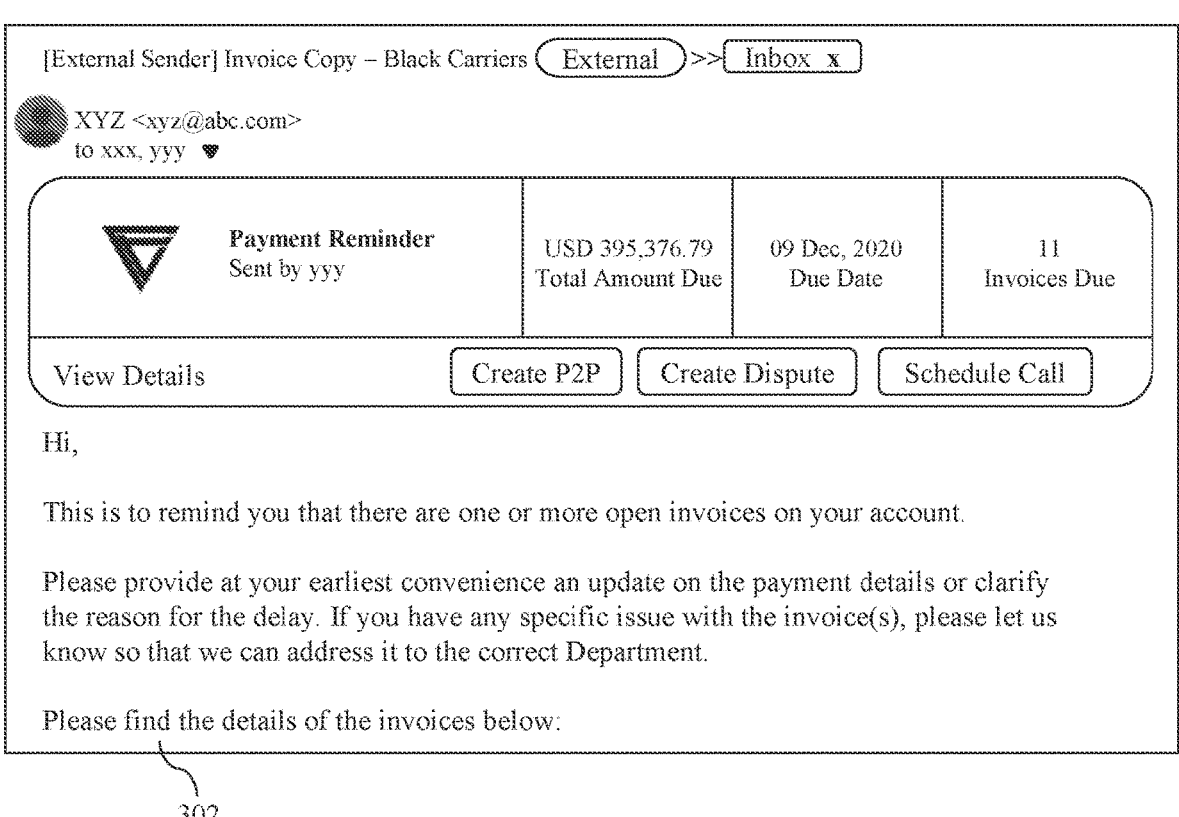

[External Sender] Invoice Copy – Black Carriers ( External ) >>( Inbox  x )

XYZ <xyz@abc.com>
to xxx, yyy ▾

| | | | |
|---|---|---|---|
| Payment Reminder Sent by yyy | USD 395,376.79 Total Amount Due | 09 Dec, 2020 Due Date | 11 Invoices Due |

View Details     ( Create P2P )   ( Create Dispute )   ( Schedule Call )

Hi,

This is to remind you that there are one or more open invoices on your account.

Please provide at your earliest convenience an update on the payment details or clarify the reason for the delay. If you have any specific issue with the invoice(s), please let us know so that we can address it to the correct Department.

Please find the details of the invoices below:

| ← ⊞ ⊕ 🗑 | ✉ 🕐 ⊘ ➡ ▱ ✎ ⋮ | | 1 of 4168    <    > |
|---|---|---|---|

Create P2P    on: 30-10-2022☐    by: xxxx        with email address: xxxx@yyy.com Selected Invoices 0 of 11

|  | Invoice Number | Open Amount | P2P Amount | Due Date |
|---|---|---|---|---|
| ☐ | 27643919 | USD 31,102.44 | 31102.44 | 2020-12-09 |
| ☐ | 27643923 | USD 154,507.60 | 154,507.60 | 2021-01-06 |
| ☐ | 27643942 | USD 14,958.00 | 14,958.00 | 2021-01-06 |
| ☐ | 27643945 | USD 8,000.00 | 8000.00 | 2021-01-27 |
| ☐ | 27643922 | USD 12,128.00 | 12128.00 | 2022-02-24 |
| ☐ | 27643932 | USD 360.00 | 360.00 | 2022-02-24 |
| ☐ | 27643909 | USD 75.00 | 75.00 | 2022-02-24 |
| ☐ | 27643918 | USD 115,585.10 | 115585.10 | 2022-02-24 |

402

400C

500A

500B

504

600

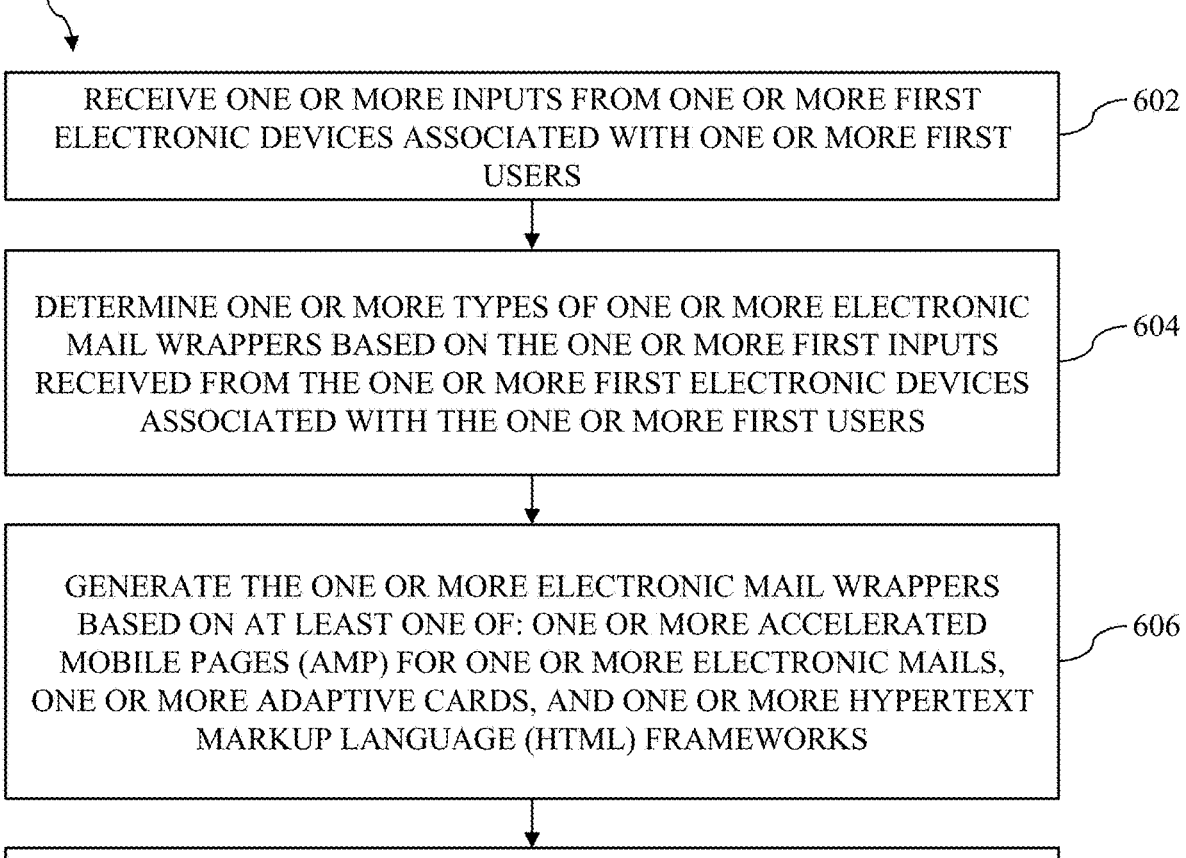

RECEIVE ONE OR MORE INPUTS FROM ONE OR MORE FIRST ELECTRONIC DEVICES ASSOCIATED WITH ONE OR MORE FIRST USERS — 602

DETERMINE ONE OR MORE TYPES OF ONE OR MORE ELECTRONIC MAIL WRAPPERS BASED ON THE ONE OR MORE FIRST INPUTS RECEIVED FROM THE ONE OR MORE FIRST ELECTRONIC DEVICES ASSOCIATED WITH THE ONE OR MORE FIRST USERS — 604

GENERATE THE ONE OR MORE ELECTRONIC MAIL WRAPPERS BASED ON AT LEAST ONE OF: ONE OR MORE ACCELERATED MOBILE PAGES (AMP) FOR ONE OR MORE ELECTRONIC MAILS, ONE OR MORE ADAPTIVE CARDS, AND ONE OR MORE HYPERTEXT MARKUP LANGUAGE (HTML) FRAMEWORKS — 606

SEND ONE OR MORE INTERACTIVE ACTIONABLE ELECTRONIC MAILS INCLUDING THE ONE OR MORE ELECTRONIC MAIL WRAPPERS BASED ON ONE OR MORE CLOUD-BASED ELECTRONIC MAIL SENDING SERVICES SUPPORTING ONE OR MORE FIRST PROTOCOLS — 608

PROVIDE AN OUTPUT OF THE ONE OR MORE INTERACTIVE ACTIONABLE ELECTRONIC MAILS WITH THE ONE OR MORE ELECTRONIC MAIL WRAPPERS, TO THE ONE OR MORE FIRST USERS ON ONE OR MORE USER INTERFACES ASSOCIATED WITH THE ONE OR MORE FIRST ELECTRONIC DEVICES     610

UPDATE ONE OR MORE DATABASES IN REAL-TIME BASED ON ONE OR MORE SECOND INPUTS, IN RESPONSE TO THE ONE OR MORE INTERACTIVE ACTIONABLE ELECTRONIC MAILS WITH THE GENERATED ONE OR MORE ELECTRONIC MAIL WRAPPERS, RECEIVED FROM ONE OR MORE SECOND ELECTRONIC DEVICES ASSOCIATED WITH THE ONE OR MORE SECOND USERS     612

FIG. 6
(CONTINUED)

SYSTEMS AND METHODS FOR GENERATING EMAILS WITH INTERACTIVE ACTIONABLE ELEMENTS

FIELD OF INVENTION

Embodiments of the present disclosure relate to computing systems, and more particularly relate to a computer-implemented method and system for generating one or more interactive actionable electronic mails.

BACKGROUND

In the field of accounts receivables, electronic mails play a crucial role in facilitating diverse aspects of business communication. The electronic mails are widely utilized for transmitting invoices, payment reminders and acknowledgments, resolving disputes, confirming payments, and the like. The electronic mails further serve as a vital channel for communicating payment terms, and disseminating account statements, ensuring customers are kept informed about their financial status. The flexibility of the electronic mails is harnessed for follow-up communications including at least one of: overdue payment reminders and updates on account statuses. Moreover, businesses employ the electronic mails to document essential transactions, agreements, and announcements, contributing to effective recordkeeping and transparent financial management.

Conventional text-based electronic mails face constraints in interactivity and user engagement, often lacking real-time updates and necessitating users to switch between applications for actions. This may result in delays, inefficiencies, and a less dynamic communication experience compared to contemporary alternatives. Current interactive electronic mails address limitations of the conventional text-based electronic mails. The current interactive electronic mails may elevate user engagement by enabling recipients to fulfill tasks directly within the electronic mails, minimizing reliance on external interactions. The current interactive electronic mails may lead to a more streamlined and efficient user experience, fostering heightened interactivity and responsiveness.

However, a notable drawback of the current interactive electronic mails is an absence of standardized support across diverse electronic mail clients. The varied rendering capabilities and security protocols employed by different electronic mail clients may result in inconsistent displays or, in some cases, the complete non-functionality of interactive elements. This fragmentation presents a challenge for the widespread adoption and seamless use of the current interactive electronic mails.

Hence, there is a need for an improved computer-implemented system and method for generating one or more interactive actionable electronic mails which are independent of recipient's electronic mail clients, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computer-implemented method for generating one or more interactive actionable electronic mails is disclosed. The computer-implemented method comprises receiving, by one or more hardware processors, one or more first inputs from one or more first electronic devices associated with one or more first users. The one or more first inputs comprise one or more first information related to at least one of: one or more electronic mail identities of one or more entities associated with one or more second users, one or more types of electronic mail wrappers to be generated.

The computer-implemented method further comprises determining, by the one or more hardware processors, the one or more types of electronic mail wrappers based on the one or more first inputs received from the one or more first electronic devices associated with the one or more first users.

The computer-implemented method further comprises generating, by the one or more hardware processors, the one or more electronic mail wrappers based on at least one of: one or more accelerated mobile pages (AMP) for one or more electronic mails, one or more adaptive cards, and one or more hypertext markup language (HTML) frameworks. The one or more electronic mail wrappers comprise at least one of: one or more promise to pay wrappers, one or more dispute wrappers, one or more call schedule wrappers, one or more contact update wrappers, and one or more payment plan wrappers.

The computer-implemented method further comprises sending, by the one or more hardware processors, the one or more interactive actionable electronic mails comprising the one or more electronic mail wrappers based on one or more cloud-based electronic mail sending services supporting one or more first protocols.

The computer-implemented method further comprises providing, by the one or more hardware processors, an output of the one or more interactive actionable electronic mails with the one or more electronic mail wrappers, to the one or more first users on one or more user interfaces associated with the one or more first electronic devices.

The computer-implemented method further comprises updating, by the one or more hardware processors, one or more databases in real-time based on one or more second inputs, in response to the one or more interactive actionable electronic mails with the generated one or more electronic mail wrappers, received from one or more second electronic devices associated with the one or more second users.

In an embodiment, the computer-implemented method further comprises (a) converting, by the one or more hardware processors, one or more electronic mail codes into one or more visual formats to be displayed on at least one of: one or more browsers, and one or more electronic mail clients, configured in at least one of: the one or more first electronic devices associated with the one or more first users, and one or more second electronic devices associated with the one or more second users; (b) determining, by the one or more hardware processors, whether at least one of: the one or more accelerated mobile pages (AMP) for the one or more electronic mails, one or more adaptive cards, and one or more hypertext markup language (HTML) frameworks, are configured in the one or more electronic mail clients; and (c) rendering, by the one or more hardware processors, the one or more electronic mails from one or more servers based on the configuration of at least one of: the one or more accelerated mobile pages (AMP) for one or more electronic mails, one or more adaptive cards, and one or more hypertext markup language (HTML) frameworks, is determined in the one or more electronic mail clients. The one or more electronic mails are retrieved from the one or more servers by one or more second protocols.

In another embodiment, generating, by the one or more hardware processors, the one or more electronic mail wrappers based on the one or more accelerated mobile pages (AMP) for one or more electronic mails comprises: (a) creating, by the one or more hardware processors, the one or more interactive actionable electronic mails to be updated in real-time; and (b) providing, by the one or more hardware processors, one or more applications related functionalities within the one or more interactive actionable electronic mails based on the one or more accelerated mobile pages (AMP).

The one or more accelerated mobile pages (AMP) is generated by: (a) generating, by the one or more hardware processors, one or more hypertext markup language (HTML) documents, with one or more accelerated mobile pages (AMP) boilerplates; (b) creating, by the one or more hardware processors, the one or more hypertext markup language (HTML) documents as one or more accelerated mobile pages (AMP) based electronic mails; (c) setting, by the one or more hardware processors, one or more responsive and dynamic layouts of the accelerated mobile pages (AMP) based electronic mails by adding one or more first accelerated mobile pages (AMP) components; (d) configuring, by the one or more hardware processors, one or more cascading style sheets (CSS) within one or more accelerated mobile pages (AMP); (e) utilizing, by the one or more hardware processors, one or more second accelerated mobile pages (AMP) components comprising at least one of: data binding components and one or more option selection components.

In yet another embodiment, generating, by the one or more hardware processors, the one or more electronic mail wrappers based on the one or more adaptive cards comprises: (a) generating, by the one or more hardware processors, at least one of: one or more content specifications and one or more layout specifications; (b) generating, by the one or more hardware processors, one or more file formats in compliance with one or more adaptive card structures by processing one or more input data associated with at least one of: the one or more content specifications and the one or more layout specifications; (c) structuring, by the one or more hardware processors, the one or more file formats to encapsulate one or more elements of the one or more electronic mail wrappers; and (d) converting, by the one or more hardware processors, the one or more file formats into the one or more electronic mail wrappers to be rendered by processing the one or more adaptive card structures based on one or more rendering engines.

The one or more content specifications comprise at least one of: one or more texts, one or more images, and one or more multimedia contents. The one or more layout specifications comprise at least one of: one or more arrangements and one or more styles, of the one or more content specifications within the one or more electronic mail wrappers. The one or more elements of the one or more electronic mail wrappers comprise at least one of: one or more headers, one or more bodies, and one or more actions. The one or more headers comprise at least one of: one or more second information associated with the one or more first users and one or more subjects of the one or more electronic mails. The one or more bodies comprise one or more contents of the one or more electronic mails formatted according to the one or more adaptive card structures. The one or more actions comprise one or more user-triggered events com prising at least one of: clicking of one or more first buttons and submission of one or more first forms.

In yet another embodiment, generating, by the one or more hardware processors, the one or more electronic mail wrappers based on the one or more hypertext markup language (HTML) frameworks comprises: (a) creating, by the one or more hardware processors, one or more hypertext markup language (HTML) contents based on a hypertext markup language (HTML) generation subsystem; and (b) setting, by the one or more hardware processors, one or more interactive elements comprising one or more second buttons, one or more second forms, one or more user interface components, within one or more hypertext markup language (HTML) structures.

The one or more interactive elements are associated with one or more predefined actions by setting at least one of: one or more script languages and one or more metadata within one or more hypertext markup language (HTML) codes. The one or more predefined actions comprise at least one of: retrieving of one or more data, submission of the one or more second forms, and triggering of external system requests.

In yet another embodiment, the computer-implemented method further comprises (a) generating, by the one or more hardware processors, one or more composite electronic mail wrappers by combining the one or more electronic mail wrappers generated from at least one of the one or more accelerated mobile pages (AMP) for one or more electronic mails, the one or more adaptive cards, and the one or more hypertext markup language (HTML) frameworks; and (b) controlling, by the one or more hardware processors, the one or more composite electronic mail wrappers to be displayed across one or more platforms by one or more parameter-driven rules based on one or more factors comprising at least one of: nature of the one or more contents of the one or more electronic mails, one or more preferences of at least one of: the one or more first users and the one or more second users, and one or more capabilities of at least one of: the one or more first electronic devices and the one or more second electronic devices.

In yet another embodiment, the one or more first protocols comprise at least one of: one or more Simple Mail Transfer Protocols (SMTP), one or more Extended Simple Mail Transfer Protocols (ESMTP), and one or more Simple Mail Transfer Protocols Secure (SMTPS).

In yet another embodiment, the one or more second protocols comprise at least one of: one or more Post Office Protocols version 3 (POP3), one or more Internet Message Access Protocols (IMAP), one or more Exchange Active-Sync, the one or more Simple Mail Transfer Protocols (SMTP), one or more Internet Message Access Protocol version 4 (IMAP4rev1), one or more Mail Access Protocols (MAP), the one or more Extended Simple Mail Transfer Protocols (ESMTP), one or more Hypertext Transfer Protocols (HTTP), and Hypertext Transfer Protocols Secure (HTTPS).

In yet another embodiment, the one or more electronic mail wrappers comprise at least one of: one or more promise to pay wrappers, one or more dispute wrappers, one or more call schedule wrappers, one or more contact update wrappers, and one or more payment plan wrappers.

In one aspect, a computer-implemented system for generating one or more interactive actionable electronic mails, is disclosed. The computer-implemented system includes one or more hardware processors and a memory coupled to the one or more hardware processors. The memory includes a plurality of subsystems in the form of programmable instructions executable by the one or more hardware processors.

The plurality of subsystems comprises an input receiving subsystem configured to receive one or more first inputs from one or more first electronic devices associated with one or more first users. The one or more first inputs comprise one or more first information related to at least one of: one or more electronic mail identities of one or more entities associated with one or more second users, one or more types of electronic mail wrappers to be generated.

The plurality of subsystems further comprises an electronic mail wrapper generation subsystem configured to: (a) determine the one or more types of electronic mail wrappers based on the one or more first inputs received from the one or more first electronic devices associated with the one or more first users; and (b) generate the one or more electronic mail wrappers based on at least one of: one or more accelerated mobile pages (AMP) for one or more electronic mails, one or more adaptive cards, and one or more hypertext markup language (HTML) frameworks. The one or more electronic mail wrappers comprise at least one of: one or more promise to pay wrappers, one or more dispute wrappers, one or more call schedule wrappers, one or more contact update wrappers, and one or more payment plan wrappers.

The plurality of subsystems further comprises an electronic mail sending subsystem configured to send the one or more interactive actionable electronic mails comprising the one or more electronic mail wrappers based on one or more cloud-based electronic mail sending services supporting one or more first protocols.

The plurality of subsystems further comprises an output subsystem configured to provide an output of the one or more interactive actionable electronic mails with the one or more electronic mail wrappers, to the one or more first users on one or more user interfaces associated with the one or more first electronic devices.

The plurality of subsystems further comprises a database updating subsystem configured to update one or more databases in real-time based on one or more second inputs, in response to the one or more interactive actionable electronic mails with the generated one or more electronic mail wrappers, received from one or more second electronic devices associated with the one or more second users.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 4A is an exemplary view of a user interface depicting that one or more second users receive the one or more interactive actionable electronic mails, in accordance with an embodiment of the present disclosure;

FIG. 6 is a flow chart illustrating a computer-implemented method for generating the one or more interactive actionable electronic mails, in accordance with an embodiment of the present disclosure.

Figure 1:
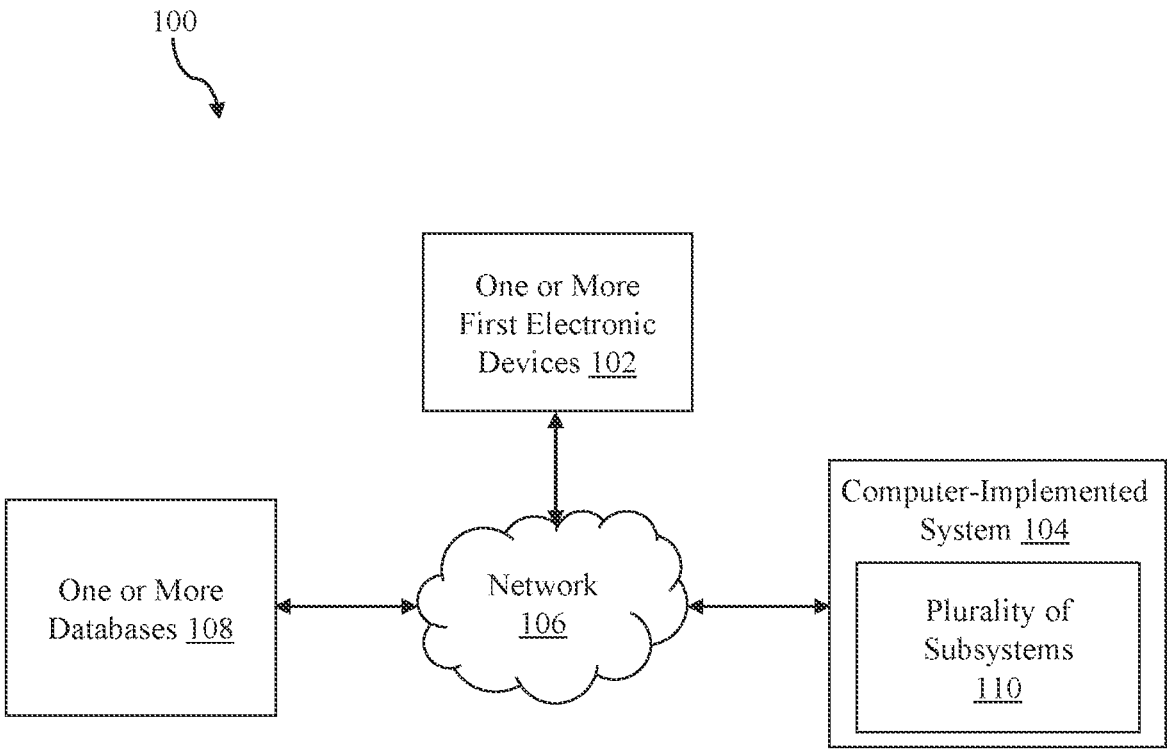
FIG. 1 is a block diagram illustrating a computing environment with a computer-implemented system for generating one or more interactive actionable electronic mails, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE
DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 is a block diagram illustrating a computing environment 100 with a computer-implemented system 104 for automatically generating one or more interactive actionable electronic mails, in accordance with an embodiment of the present disclosure. According to FIG. 1, the computing environment 100 includes one or more first electronic devices 102 that are communicatively coupled to the computer-implemented system 104 through a network 106. The one or more first electronic devices 102 through which one or more first users provide one or more inputs to the computer-implemented system 104.

In an embodiment, the one or more first users may include at least one of: one or more data analysts, one or more business analysts, one or more cash analysts, one or more financial analysts, one or more collection analysts, one or more debt collectors, one or more professionals associated with cash and collection management, and the like.

The present invention is configured to automatically generate one or more interactive actionable electronic mails with one or more electronic mail wrappers. The computer-implemented system 104 is initially configured to receive one or more inputs from the one or more first electronic devices 102 associated with the one or more first users. In an embodiment, the one or more inputs may include one or more first information related to at least one of: one or more electronic mail identities of one or more entities associated with one or more second users, one or more types of electronic mail wrappers required to be generated, and one or more payment details (e.g., invoice details) of the one or more entities associated with the one or more second users.

In an embodiment, the one or more entities associated with the one or more second users may include at least one of: one or more customers, one or more organizations, one or more corporations, one or more parent companies, one or more subsidiaries, one or more joint ventures, one or more partnerships, one or more governmental bodies, one or more associations, one or more legal entities, and the like.

The computer-implemented system 104 is further configured to retrieve one or more data associated with one or more entities from one or more databases 108 based on the one or more first inputs received from the one or more first electronic devices 102 associated with the one or more first users. In an embodiment, the one or more first information and one or more data associated with the one or more second users, may be encrypted and decrypted by the computer-implemented system 104 so that one or more third party users cannot be authenticated to manipulate the one or more first information and the one or more data.

The computer-implemented system 104 is further configured to determine the one or more types of electronic mail wrappers based on the one or more first inputs received from the one or more first electronic devices 102 associated with the one or more first users. The computer-implemented system 104 is further configured to generate the one or more electronic mail wrappers based on at least one of: one or more accelerated mobile pages (AMP) for one or more electronic mails, one or more adaptive cards, and one or more hypertext markup language (HTML) frameworks. In an embodiment, the one or more electronic mail wrappers may include at least one of: one or more promise to pay wrappers, one or more dispute wrappers, one or more call schedule wrappers, one or more contact update wrappers, and one or more payment plan wrappers.

The computer implemented system 104 is further configured to create composite electronic mail wrappers by combining counterparts generated from the one or more accelerated mobile pages (AMP), the one or more adaptive cards, and the one or more hypertext markup language (HTML) frameworks. The composite email wrapper, containing elements from AMP, adaptive cards, and HTML, is dynamically selected for display based on the capabilities of the second user's (e.g. recipient) electronic mail client. To ensure an optimal user experience, a fallback mechanism is incorporated. This mechanism allows the electronic mail client to assess the quality of the initial wrapper, identifying suboptimal displays due to unsupported features or rendering issues. In the event of a suboptimal display, a subsystem transitions to the next available electronic mail wrapper, repeating the process until an optimal one is found. The selection of wrappers follows a defined priority order, progressing from AMP to adaptive cards and, if necessary, to HTML frameworks. Additionally, the computer implemented system 104 maintains a mapping of electronic mail client capabilities to electronic mail wrapper types, ensuring compatibility and facilitating the selection of the most suitable wrapper for display. This comprehensive approach enhances the adaptability and user experience in handling diverse email clients and content formats.

The computer-implemented system 104 is further configured to send the one or more interactive actionable electronic mails including the one or more electronic mail
wrappers based on one or more cloud-based electronic mail
sending services supporting one or more first protocols. The
computer-implemented system 104 is further configured to
convert one or more electronic mail codes into one or more
visual formats to be displayed on at least one of: one or more
browsers, and one or more electronic mail clients, config-
ured in at least one of the one or more first electronic devices
102 associated with the one or more first users, and one or
more second electronic devices associated with the one or
more second users.

The computer-implemented system 104 is further config-
ured to provide an output of the one or more interactive
actionable electronic mails with the one or more electronic
mail wrappers, to the one or more first users on one or more
user interfaces associated with the one or more first elec-
tronic devices 102. The computer-implemented system 104
is further configured to update the one or more databases 108
in real-time based on one or more second inputs, in response
to the one or more interactive actionable electronic mails
with the generated one or more electronic mail wrappers,
received from the one or more second users.

The computer-implemented system 104 may be hosted on
a central server including at least one of: a cloud server or
a remote server. In an embodiment, the computer-imple-
mented system 104 may include at least one of: a user
device, a server computer, a server computer over the
network 106, a cloud-based computing system, a cloud-
based computing system over the network 106, a distributed
computing system, and the like. Further, the network. 106
may be at least one of: a Wireless-Fidelity (Wi-Fi) connec-
tion, a hotspot connection, a Bluetooth connection, a local
area network (LAN), a wide area network (WAN), any other
wireless network, and the like. In an embodiment, the one or
more first electronic devices 102 and the one or more second
electronic devices, may include at least one of: a laptop
computer, a desktop computer, a tablet computer, a Smart-
phone, a wearable device, a Smart watch, and the like.

Further, the computing environment 100 includes the one
or more databases 108 communicatively coupled to the
computer-implemented system 104 through the network

106. In an embodiment, the one or more databases 108
include at least one of: one or more relational databases, one
or more object-oriented databases, one or more data ware-
houses, one or more cloud-based databases, and the like. In
another embodiment, a format of the one or more data
retrieved from the one or more databases 108 may include
at least one of: a comma-separated values (CSV) format, a
JavaScript Object Notation (JSON) format, an Extensible
Markup Language (XML), spreadsheets, and the like. Fur-
thermore, the one or more first electronic devices 102 and
the one or more second electronic devices, may include at
least one of: a local browser, a mobile application, and the
like.

Furthermore, the one or more first users may use a web
application through the local browser, the mobile application
to communicate with the computer-implemented system
104. In an embodiment of the present disclosure, the com-
puter-implemented system 104 includes a plurality of sub-
systems 110. Details on the plurality of subsystems 110 have
been elaborated in subsequent paragraphs of the present
description with reference to FIG. 2.

Figure 2:
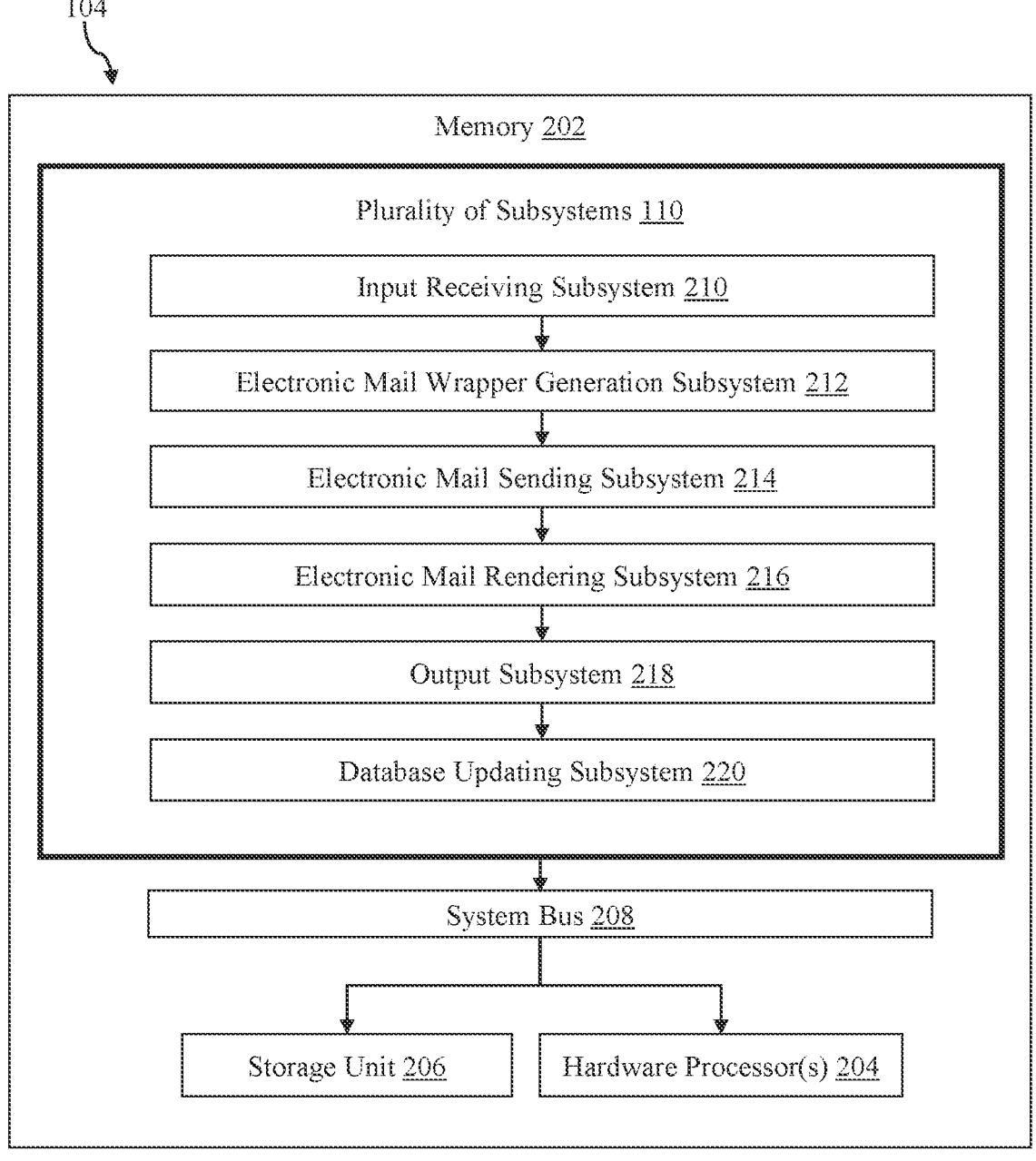
FIG. 2 is a detailed view of the computer-implemented system for generating the one or more interactive actionable electronic mails, in accordance with another embodiment of the present disclosure.

FIG. 2 is a detailed view of the computer-implemented
system 104 for generating the one or more interactive
actionable electronic mails, in accordance with another
embodiment of the present disclosure. The computer-imple-
mented system 104 includes a memory 202, one or more
hardware processors 204, and a storage unit 206. The
memory 202, the one or more hardware processors 204, and
the storage unit 206 are communicatively coupled through a
system bus 208 or any similar mechanism. The memory 202
includes the plurality of subsystems 110 in the form of
programmable instructions executable by the one or more
hardware processors 204.

The plurality of subsystems 110 includes an input receiv-
ing subsystem 210, an electronic mail wrapper generation
subsystem 212, an electronic mail sending subsystem 214,
an electronic mail rendering subsystem 216, an output
subsystem 218, and a database updating subsystem 220. The
brief details of the plurality of subsystems 110 have been
elaborated in a below table.

| Plurality of Subsystems 110 | Functionality |
|---|---|
| Input receiving subsystem 210 | The input receiving subsystem 210 is configured to receive the one or more first inputs from the one or more first electronic devices 102 associated with the one or more first users. The input receiving subsystem 210 is further configured to retrieve one or more data of the one or more entities associated with the one or more second users based on the one or more first inputs. |
| Electronic mail wrapper generation subsystem 212 | The electronic mail wrapper generation subsystem 212 is configured to determine the one or more types of electronic mail wrappers based on the one or more first inputs received from the one or more first electronic devices 102 associated with the one or more second users. The electronic mail wrapper generation subsystem 212 is configured to generate the one or more electronic mail wrappers based on at least one of: the one or more accelerated mobile pages (AMP) for one or more electronic mails, the one or more adaptive cards, and the one or more hypertext markup language (HTML) frameworks. |
| Electronic mail sending subsystem 214 | The Electronic mail sending subsystem 214 is configured to send the one or more interactive actionable electronic mails including the one or more electronic mail wrappers based on one or more cloud-based electronic mail sending services supporting one or more first protocols. |
| Electronic mail rendering subsystem 216 | The Electronic mail rendering subsystem 216 is configured to converting the one or more electronic mail codes into the one or more visual formats to be displayed on at least one of: the |

-continued

| Plurality of Subsystems 110 | Functionality |
|---|---|
| | one or more browsers, and the one or more electronic mail clients, configured in at least one of: the one or more first electronic devices 102 associated with the one or more first users, and the one or more second electronic devices associated with the one or more second users. |
| Output Subsystem 218 | The output subsystem 218 is configured to provide the output of the one or more interactive actionable electronic mails with the one or more electronic mail wrappers, to the one or more first users on the one or more user interfaces associated with the one or more first electronic devices 102. |
| Database updating subsystem 220 | The database updating subsystem 220 is configured to update the one or more databases 108 in real-time based on the one or more second inputs, in response to the one or more interactive actionable electronic mails with the generated one or more electronic mail wrappers, received from the one or more second users. |

The one or more hardware processors 204, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, including at least one of: generic or programmable logic devices or arrays, application specific integrated circuits, single-chip computers, and the like.

The memory 202 may be non-transitory volatile memory and non-volatile memory. The memory 202 may be coupled for communication with the one or more hardware processors 204, being a computer-readable storage medium. The one or more hardware processors 204 may execute machine-readable instructions and/or source code stored in the memory 202. A variety of machine-readable instructions may be stored in and accessed from the memory 202. The memory 202 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of subsystems 110 stored in the form of machine-readable instructions on any of the above-mentioned storage media and may be in communication with and executed by the one or more hardware processors 204.

The storage unit 206 may be a cloud storage, a Structured Query Language (SQL) data store, a noSQL database or a location on a file system directly accessible by the plurality of subsystems 110.

The plurality of subsystems 110 includes the input receiving subsystem 210 that is communicatively connected to the one or more hardware processors 204. The input receiving subsystem 210 is configured to receive the one or more inputs from the one or more first electronic devices 102 associated with the one or more first users. In an embodiment, the one or more first inputs may include one or more first information related to at least one of: the one or more electronic mail identities (Email IDs) of the one or more entities associated with the one or more second users, the one or more types of the electronic mail wrappers required to be generated, and the one or more payment details of the one or more entities associated with the one or more second users.

In an embodiment, the input receiving subsystem 210 is further configured to retrieve the one or more data associated with the one or more second users from the one or more databases 108, based on the one or more first inputs received from the one or more first electronic devices 102 associated with the one or more first users. In an embodiment, the one or more data are used for credit risk assessment of the one or more entities associated with the one or more first users.

In an embodiment, the one or more electronic mail wrappers may include at least one of: the one or more promise to pay wrappers, the one or more dispute wrappers, the one or more call schedule wrappers, the one or more contact update wrappers, and the one or more payment plan wrappers. The one or more promise to pay wrappers are configured to dynamically record one or more details of a commitment or assurance made by the one or more second users (e.g., the one or more customers or one or more buyers), indicating that the one or more second users may fulfill a financial obligation at a specified time over the one or more interactive actionable electronic mails, facilitating real-time updates in the one or more databases 108. In a non-limiting example, the one or more second users may select the invoice using a checkbox which may automatically record the second user's intention to promise to pay. The system dynamically records details of this commitment or assurance made by the one or more second users. These details may include the invoice number, the open amount, a promise to pay amount and the specified time for payment.

The one or more dispute wrappers are configured to dynamically record a dispute between two entities, typically a buyer (e.g., the one or more second users) and a seller (e.g., the one or more first users) regarding an amount or terms of an accounts receivables transaction over the one or more interactive actionable electronic mails, facilitating the real-time updates in the one or more databases 108. In a non-limiting example, the one or more second users may select the invoice which is to be disputed using a checkbox which may automatically record the second user's intention to dispute the invoice. Further, the one or more second users may enter the reason or reason code with contact details. The system dynamically records details of this dispute made by the one or more second users. These details may include the invoice number, the open amount, a promise to pay amount, due date, the dispute reason and the contact details.

The one or more call schedule wrappers are configured to dynamically schedule a call between the buyer and the seller over the one or more interactive actionable electronic mails, facilitating the real-time updates in the one or more databases 108. In a non-limiting example, the one or more second users may schedule a call with a first user by entering the second user's contact details, including contact number and name.

The one or more contact update wrappers are configured to dynamically update one or more contact details of the one or more customers over the one or more interactive actionable electronic mails, facilitating the real-time updates in the one or more databases 108. The updation of the one or more contact details is useful when the one or more first users (e.g., the one or more collection analysts) cannot reach the one or more second users (e.g., the one or more customers) by phone but has a functional electronic mail address. In such cases, the one or more collection analysts may send an interactive email, allowing the one or more customers to provide accurate and updated information. The computer-implemented system 104 may then automatically update the one or more contact details with new information associated with the one or more second users. In a non-limiting example, the one or more second users may update their contact details by entering the second user's contact details, including contact number and name.

The one or more payment plan wrappers are configured to dynamically create one or more payment plans for the one or more customers over the one or more interactive actionable electronic mails, facilitating the real-time updates in the one or more databases 108. The one or more payment plans work as an alternate mode of payment, where the one or more customers may pay in part based on a fixed time/fixed amount. The one or more payment plan wrappers may further help in at least one of: setting up one or more new payment plans and editing one or more existing payment plans. In a non-limiting example, the one or more second users may select from payment plans through the user interface.

The plurality of subsystems 110 further includes the electronic mail wrapper generation subsystem 212 that is communicatively connected to the one or more hardware processors 204. The electronic mail wrapper generation subsystem 212 is configured to determine the one or more types of the electronic mail wrappers by based on the one or more first inputs received from the one or more first electronic devices 102 associated with the one or more first users. The electronic mail wrapper generation subsystem 212 is further configured to generate the one or more electronic mail wrappers based on at least one of: the one or more accelerated mobile pages (AMP) for one or more electronic mails, the one or more adaptive cards, and the one or more hypertext markup language (HTML) frameworks.

In an embodiment, the one or more electronic mail wrappers are HTML documents that include at least one of: structure, style, and metadata, of an electronic mail message. The electronic mail message may include at least one of: (a) a head section that defines document type, character encoding, title, and style sheets, (b) a body section that include content and layout of the electronic mail message. The one or more electronic mail wrappers may further include conditional comments, media queries, and web fonts to enhance compatibility and responsiveness of the electronic mail across one or more first electronic devices 102 and one or more electronic mail clients. The one or more electronic mail wrappers are usually separated from the electronic mail content using placeholders or variables that may be dynamically replaced by the electronic mail content at the time of sending. The one or more electronic mail wrappers may further be reused for different electronic mail messages that share the same design and layout.

In an embodiment, the electronic mail generation subsystem 212 is configured to generate the one or more electronic mail wrappers based on the one or more inputs using the one or more accelerated mobile pages (AMP) for the one or more electronic mails. The accelerated mobile pages (AMP) for the one or more electronic mails is a technology that allows the one or more first users (e.g., one or more electronic mail senders) to generate dynamic and interactive electronic mails that may be updated in real time and provide application-like functionality within the electronic mail. The one or more accelerated mobile pages (AMP) for the one or more electronic mails are based on an open-source AMP HTML framework.

For generating the one or more accelerated mobile pages (AMP) for the one or more electronic mails, the electronic mail wrapper generation subsystem 212 is initially configured to generate one or more hypertext markup language (HTML) documents incorporating one or more accelerated mobile pages (AMP) boilerplates. The electronic mail wrapper generation subsystem 212 is further configured to establish/create the one or more hypertext markup language (HTML) documents as one or more accelerated mobile pages (AMP) based electronic mails based on one or more attributes comprising amp4email within one or more root hypertext markup language (HTML) tags.

In an embodiment, the one or more hypertext markup language (HTML) documents are designed to accommodate one or more responsive and dynamic layouts to enhance overall user experience. In other words, the electronic mail wrapper generation subsystem 212 is further configured to set the one or more responsive and dynamic layouts of the accelerated mobile pages (AMP) based electronic mails by adding one or more first accelerated mobile pages (AMP) components including at least one of: one or more amp-lists and one or more amp-mustaches. In an embodiment, the one or more amp-lists are configured for one or more dynamic lists and the one or more amp-mustaches are configured for one or more template-driven contents.

The electronic mail wrapper generation subsystem 212 is further configured to implement one or more cascading style sheets (CSS) within one or more style amp4email tags attached to one or more specifications and constraints associated with the one or more accelerated mobile pages (AMP). The electronic mail wrapper generation subsystem 212 is further configured to utilize/leverage one or more second accelerated mobile pages (AMP) components including at least one of: data binding components and option selection components, for achieving an interactive aspect of the one or more electronic mails. In an embodiment, a critical aspect of the electronic mail wrapper generation using the one or more accelerated mobile pages (AMP) for the one or more electronic mails involves rigorous testing to ensure compliance with AMP standards and cross-client compatibility.

The electronic mail wrapper generation subsystem 212 is further configured to assess at least one of: validity and integrity of the one or more accelerated mobile pages (AMP) based on one or more third accelerated mobile pages (AMP) components including at least one of: one or more accelerated mobile pages (AMP) playgrounds and one or more accelerated mobile pages (AMP) validators, upon testing of the one or more accelerated mobile pages (AMP) for the one or more electronic mails. In an embodiment, the electronic mail wrapper generation subsystem 212 is further configured to integrate a mechanism for fallback content using an "amp-accordion" component to provide alternative user experience in non-AMP-supported environments so that the potential limitations of AMP support across various electronic mail clients are recognized.

In an embodiment, prior to deployment, comprehensive testing is conducted across various electronic mail clients to validate correct rendering of dynamic content and the degradation in the non-AMP-supported environments. In another embodiment, one or more test electronic mails are sent to assess functionality, and analytics data are reviewed to evaluate user engagement with the dynamic elements. To stay current with evolving standards and best practices, the electronic mail wrapper generation subsystem 212 is configured to recommend periodic reference to the one or more accelerated mobile pages (AMP) (e.g., official AMP) for electronic mail documentation. The electronic mail wrapper generation subsystem 212 is configured to provide a comprehensive and technically detailed approach to generate the one or more electronic mail wrappers using the one or more accelerated mobile pages (AMP) for the one or more electronic mails, offering a dynamic and interactive electronic mail experience while addressing potential compatibility challenges across various electronic mail clients.

In another embodiment, the electronic mail generation subsystem 212 is configured to generate the one or more electronic mail wrappers based on the one or more inputs using the one or more adaptive cards. The adaptive card is a technology that allows the one or more first users (e.g., the one or more electronic mail senders) to generate one or more interactive contents that may display rich and dynamic content, including at least one of: images, graphs, buttons, inputs, and the like. The one or more interactive contents are based on a JavaScript Object Notation (JSON) format that defines one or more layouts and elements of the one or more adaptive cards, and may be rendered natively by one or more applications and platforms, including at least one of: Outlook, Teams, Windows within the one or more electronic mails. In an embodiment, the one or more adaptive cards are based on an open-source framework.

For generating one or more electronic mail wrappers based on the one or more adaptive cards, the electronic mail wrapper generation subsystem 212 is initially configured to generate at least one of: one or more content specifications and one or more layout specifications. In an embodiment, the one or more content specifications may include at least one of: one or more texts, one or more images, and one or more multimedia contents. The one or more layout specifications may include at least one of: one or more arrangements and one or more styles, of the one or more content specifications within the one or more electronic mail wrappers. The electronic mail wrapper generation subsystem 212 is further configured to generate one or more file formats (e.g., in JSON representation) in compliance with one or more adaptive card structures (e.g., Microsoft adaptive card schema) by processing one or more input data associated with at least one of: the one or more content specifications and the one or more layout specifications.

The electronic mail wrapper generation subsystem 212 is further configured to structure the one or more file formats to encapsulate one or more elements of the one or more electronic mail wrappers. The one or more elements of the one or more electronic mail wrappers may include at least one of: one or more headers, one or more bodies, and one or more actions. The one or more headers may include at least one of: one or more second information associated with the one or more first users and one or more subjects of the one or more electronic mails. The one or more bodies may include one or more contents of the one or more electronic mails formatted according to the one or more adaptive card structures. The one or more actions may include one or more user-triggered events comprising at least one of: clicking of one or more first buttons and submission of one or more first forms.

The electronic mail wrapper generation subsystem 212 is further configured to convert the one or more file formats into the visually appealing and one or more interactive electronic mail wrappers to be rendered by processing/interpreting the one or more adaptive card structures based on one or more rendering engines. In an embodiment, the one or more rendering engines are configured to interpret the one or more adaptive card structures and dynamically render the one or more electronic mail wrappers, ensuring compatibility with a wide range of electronic mail clients. The generated electronic mail wrappers are then embedded within the electronic mail messages, ready for transmission to the one or more second users (e.g., one or more recipients).

In an embodiment, to enable actionable interactivity, the electronic mail wrapper generation subsystem 212 is further configured to integrate one or more event handling mechanisms within the generated one or more electronic mail wrappers. This involves associating specific actions with user interactions, including at least one of: clicking the one or more buttons to submit the one or more first forms and triggering a predefined workflow. The event handling logic is encapsulated within the JSON representation, ensuring that the one or more electronic mail wrappers remain fully functional irrespective of the recipient's electronic mail clients.

The electronic mail wrapper generation subsystem 212 includes a mechanism for real-time data synchronization between the one or more electronic mail wrappers and one or more external systems. This allows for the seamless integration of live data within the one or more electronic mail wrappers, ensuring that the one or more second users interact with the most up-to-date information. The synchronization process is facilitated by incorporating data-binding attributes within the one or more adaptive card schema, enabling dynamic updates without the need for manual intervention.

In another embodiment, the electronic mail generation subsystem 212 is configured to generate the one or more electronic mail wrappers based on the one or more inputs using the one or more hypertext markup language (HTML) frameworks. The electronic mail generation subsystem 212 includes a hypertext markup language (HTML) generation subsystem responsible for dynamically generating one or more interactive HTML contents. The hypertext markup language (HTML) generation subsystem is configured to allow developers to define one or more interactive elements, including one or more second buttons, one or more second forms, and one or more user interface components, within one or more hypertext markup language (HTML) structures. In other words, the hypertext markup language (HTML) generation subsystem is configured to set the one or more interactive elements including at least one of: the one or more second buttons, the one or more second forms, the one or more user interface components, within the one or more hypertext markup language (HTML) structures.

In an embodiment, the one or more interactive elements are associated with one or more predefined actions by setting at least one of: one or more script languages and one or more metadata within one or more hypertext markup language (HTML) codes. The one or more predefined actions may include at least one of: retrieving of one or more data, submission of the one or more second forms, and triggering of external system requests. In an embodiment, the one or more hypertext markup language (HTML) frameworks are configured to allow for real-time data synchronization responsible for establishing and maintaining a bidirectional communication channel between a hypertext markup language (HTML) page and the one or more external systems. The one or more hypertext markup language (HTML) frameworks are configured to employ WebSocket or similar technologies to enable real-time data exchange.

In another embodiment, the one or more hypertext markup language (HTML) frameworks are configured for implementing a data binding mechanism that associates one or more HTML elements with specific data sources. When the one or more data in the external systems change, the real-time data synchronization mechanism triggers updates to the corresponding HTML elements, ensuring that the one or more second users always interact with the updated information.

In another embodiment, to ensure secure communication between the HTML page and the one or more external systems, the electronic mail generation subsystem 212 is configured to incorporate an authentication and authorization layer. The authentication and authorization layer verifies user credentials and permissions before allowing access to sensitive data or executing specific actions. In certain embodiments, this may be achieved by providing signed uniform resource locators (URLs) that include one or more JSON web tokens (JWT tokens) for authentication and validation. In certain embodiments, the one or more hypertext markup language (HTML) generated by the computer-implemented system 104 adheres to web standards and is designed to be compatible with a wide range of electronic mail clients and web browsers. In other embodiments, accessibility features may be implemented to ensure a seamless experience for the one or more second users with disabilities.

In an embodiment, the electronic mail generation subsystem 212 is configured to generate one or more composite electronic mail wrappers by combining the one or more electronic mail wrappers generated from at least one of: the one or more accelerated mobile pages (AMP) for one or more electronic mails, the one or more adaptive cards, and the one or more hypertext markup language (HTML) frameworks. In an embodiment, the one or more composite electronic mail wrappers are configured such that the one or more interactive electronic mails may be displayed in the most optimal manner. Based on the electronic mail clients, the one or more electronic mail wrappers generated by the one or more accelerated mobile pages (AMP) for the one or more electronic mail wrappers, the one or more adaptive cards, and the one or more hypertext markup language (HTML) frameworks, are displayed to the one or more second users (e.g., a receiver) of the one or more electronic mails.

In an embodiment, the one or more composite electronic mail wrappers are governed/controlled by the one or more parameter-driven rules that considers one or more factors including at least one of: nature of the one or more contents of the one or more electronic mails, one or more preferences of at least one of the one or more first users and the one or more second users, and one or more capabilities of at least one of: the one or more first electronic devices 102 and the one or more second electronic devices. As an example, for call schedule wrappers, the parameter-driven rules may enhance the user experience based on the nature of the call schedule. If a call schedule includes multiple time zones, a "time-zone-friendly" rule might trigger a wrapper that displays the schedule in the user's local time. In another example, the parameter-driven rules for payment plan wrappers may optimize the presentation of information based on the specifics of the payment plan. If the plan includes flexible payment options, a "payment flexibility" rule might tailor the wrapper to highlight different payment methods and terms. This ensures the creation of an effective and interactive electronic mail wrappers that optimally display across one or more platforms. In a non-limiting example, the optimal user interface is a key focus, and each electronic mail wrapper generated is configured to adapt seamlessly to the characteristics of the recipient's electronic mail client.

In another embodiment, to further enhance user interface, the electronic mail wrapper generation subsystem 212 incorporates a fallback mechanism. The electronic mail client assesses quality of the initial electronic mail wrapper, identifying suboptimal displays based on criteria like unsupported features or rendering issues. In the event of suboptimal display, the electronic mail wrapper generation subsystem 212 is configured to transition to the next available electronic mail wrapper. This fallback process continues until the electronic mail wrapper meeting the optimal criteria is found.

In yet another embodiment, the selection of the one or more electronic mail wrappers follows a defined priority order, implemented through an algorithm. The selection may begin with the one or more accelerated mobile pages (AMP), progresses to the one or more adaptive cards, and finally resorts to the one or more hypertext markup language (HTML) frameworks, if needed. In an embodiment, the computer-implemented system 104 is configured to maintain a mapping of electronic mail client capabilities to electronic mail wrapper types, ensuring compatibility and optimal selection.

The plurality of subsystems 110 further includes the electronic mail sending subsystem 214 that is communicatively connected to the one or more hardware processors 204. The electronic mail sending subsystem 214 is configured to send the one or more interactive actionable electronic mails including the one or more electronic mail wrappers based on one or more cloud-based electronic mail sending services supporting one or more first protocols. The electronic mail sending subsystem 214 is configured to provide the capabilities to send high-quality and personalized electronic mails. The electronic mail sending subsystem 214 utilizes the one or more cloud-based electronic mail sending services for sending the one or more electronic mails at scale.

In an embodiment, the one or more first protocols supported by the one or more cloud-based electronic mail sending services may include at least one of: one or more Simple Mail Transfer Protocols (SMTP), one or more Extended Simple Mail Transfer Protocols (ESMTP), one or more Simple Mail Transfer Protocols Secure (SMTPS), and the like. In an embodiment, the flexibility facilitates seamless integration into applications or utilization with standard electronic mail clients. In an embodiment, the electronic mail sending subsystem 214 is further configured to provide content filtering options to align with electronic mail sending policies, minimizing risks of delivering unwanted and malicious contents.

The plurality of subsystems 110 further includes the electronic mail rendering subsystem 216 that is communicatively connected to the one or more hardware processors 204. In an embodiment, the electronic mail rendering subsystem 216 is a part of an electronic mail receiving system of the one or more second users (e.g., one or more recipients). The electronic mail rendering subsystem 216 is configured to convert the one or more electronic mail codes into the one or more visual formats to be displayed on at least one of: the one or more browsers, and the one or more electronic mail clients, configured in at least one of: the one or more first electronic devices 102 associated with the one or more first users, and the one or more second electronic devices associated with the one or more second users.

The electronic mail rendering subsystem 216 is further configured to determine whether at least one of: the one or more accelerated mobile pages (AMP) for the one or more electronic mails, the one or more adaptive cards, and the one or more hypertext markup language (HTML) frameworks, are configured/supported in the one or more electronic mail clients. In other words, the electronic mail rendering subsystem 216 is further configured to determine whether the one or more accelerated mobile pages (AMP) are supported in the one or more electronic mail clients. If the one or more accelerated mobile pages (AMP) are supported, the electronic mail rendering subsystem 216 renders an electronic mail wrapper specifically tailored for the one or more accelerated mobile pages (AMP).

If the one or more accelerated mobile pages (AMP) are not supported, the electronic mail rendering subsystem 216 then determines whether the one or more adaptive cards are configured/supported in the one or more electronic mail clients, for a dynamic content presentation format optimized for Microsoft environments. If the one or more adaptive cards are configured/supported in the one or more electronic mail clients, the electronic mail rendering subsystem 216 renders the one or more interactive actionable electronic mails. If the one or more adaptive cards are not configured/supported in the one or more electronic mail clients, the electronic mail rendering subsystem 216 then resorts to rendering the one or more electronic mails in hypertext markup language (HTML) HTML format to ensure compatibility with a wide range of the one or more electronic mail clients. In an embodiment, the electronic mail rendering subsystem 216 utilizes one or more second protocols for rendering the one or more electronic mails from the one or more servers.

In an embodiment, the one or more second protocols may include at least one of: one or more Post Office Protocols version 3 (POP3), one or more Internet Message Access Protocols (IMAP), one or more Exchange ActiveSync, the one or more Simple Mail Transfer Protocols (SMTP), one or more Internet Message Access Protocol version 4 (IMAP4rev1), one or more Mail Access Protocols (MAP), the one or more Extended Simple Mail Transfer Protocols (ESMTP), one or more Hypertext Transfer Protocols (HTTP), and Hypertext Transfer Protocols Secure (HTTPS).

The plurality of subsystems 110 further includes the output subsystem 218 that is communicatively connected to the one or more hardware processors 204. The output subsystem 218 is configured to provide the output of the one or more interactive actionable electronic mails with the one or more electronic mail wrappers, to the one or more first users on the one or more user interfaces associated with the one or more first electronic devices 102.

The plurality of subsystems 110 further includes the database updating subsystem 220 that is communicatively connected to the one or more hardware processors 204. The database updating subsystem 220 is configured to update the one or more databases 108 in real-time based on one or more second inputs, in response to the one or more interactive actionable electronic mails with the generated one or more electronic mail wrappers, received from the one or more second users. In one embodiment, the one or more interactive actionable electronic mails may relate to at least one of: one or more promise to pay based electronic mails, one or more dispute based electronic mails, one or more call scheduler based electronic mails, one or more contact details update based electronic mails, and one or more payment plan based electronic mails.

In an embodiment, the database updating subsystem 220 is configured to allow the one or more second users (e.g., the one or more recipients) the ability to interact with the one or more electronic mails through the one or more user interfaces, which allows the one or more electronic mails to update information within the database updating subsystem 220. This innovative feature provides the one or more second users with an interactive approach to modifying information, deviating from the conventional method of responding to the one or more electronic mails. Rather than adhering to the traditional approach of replying, the one or more second users may now seamlessly engage with and update information directly within the one or more user interfaces of an electronic mail system.

In one embodiment, the promise to pay based electronic mails are configured to capture a commitment or assurance from a customer regarding a financial obligation. The one or more interactive actionable electronic mails enable the customer to confirm their promise to pay by clicking on a dedicated button. Once clicked, the customer is directed to a secure page where the customer can choose a payment method and set up automatic payments. The interactive component is intricately linked to the backend database, employing secure application programming interface (API) calls. This connection allows real-time updates in the one or more databases 108, ensuring transparency and efficient tracking of financial commitments. The database updating subsystem 220 registers the confirmation, updating the corresponding transaction record with the commitment details, providing an accurate and up-to-date representation of the customer's financial obligation.

In another embodiment, the one or more dispute based electronic mails serves as a dynamic tool for recording and resolving disputes between the entities, typically buyers (e.g., the one or more second users) and sellers (e.g., the one or more first users). The one or more interactive actionable electronic mails include one or more links for the involved parties to access details of the disputed transaction and submit supporting evidence. For instance, a buyer can click on the provided link, review the disputed items, and upload relevant documents or notes to substantiate their position. The interactive elements trigger backend processes that update the one or more databases 108 in real-time. The database updating subsystem 220 logs the dispute details, attaches the submitted evidence to the transaction record, and initiates workflow processes for dispute resolution, ensuring that both parties have access to the latest information on the dispute status.

In yet another embodiment, the one or more call scheduler based electronic mails streamlines the process of scheduling calls between the buyers and sellers. The one or more interactive actionable electronic mails incorporate calendar integration, allowing the buyer to click on a link and select a convenient time for a call. Once the appointment is confirmed within the electronic mail, the database updating subsystem 220 updates the one or more databases 108 with the scheduled call time and sends calendar invites to both parties. Behind the scenes, the electronic mail interaction triggers database transactions through secure protocols, creating and updating records related to the scheduled calls. This integration ensures that all relevant stakeholders have access to the latest call schedule information in the one or more databases 108.

In yet another embodiment, the one or more contact details update based electronic mails are configured to provide a solution for updating customer contact information. This approach proves valuable when the one or more collection analysts cannot reach the one or more customers by phone but has the functional electronic mail address. The one or more interactive actionable electronic mails include a form or link for the one or more customers to update their contact details directly. Upon submission, the database updating subsystem 220 is configured to automatically update the one or more databases 108 with the new/updated information, leveraging secure data transmission protocols. The backend processes authenticate and validate the updated contact details before integrating them into the customer record, ensuring the accuracy and integrity of the one or more databases 108.

In yet another embodiment, the one or more payment plan based electronic mails are configured for creating or modifying one or more payment plans. The one or more customers may click on options like "Set Up Payment Plan" or "Modify Payment Plan" within the one or more electronic mails. This action allows the one or more customers to specify installment amounts and schedules, with real-time updates in the one or more databases 108 reflecting one or more new payment plan details. In an embodiment, secure API calls between the electronic mail interface and the one or more databases 108 facilitate this interaction, triggering transactions that update or create payment plan records. This seamless integration ensures that the one or more databases 108 accurately represents the latest payment arrangements made by the one or more customers, contributing to a more efficient and responsive financial system.

Figure 3:
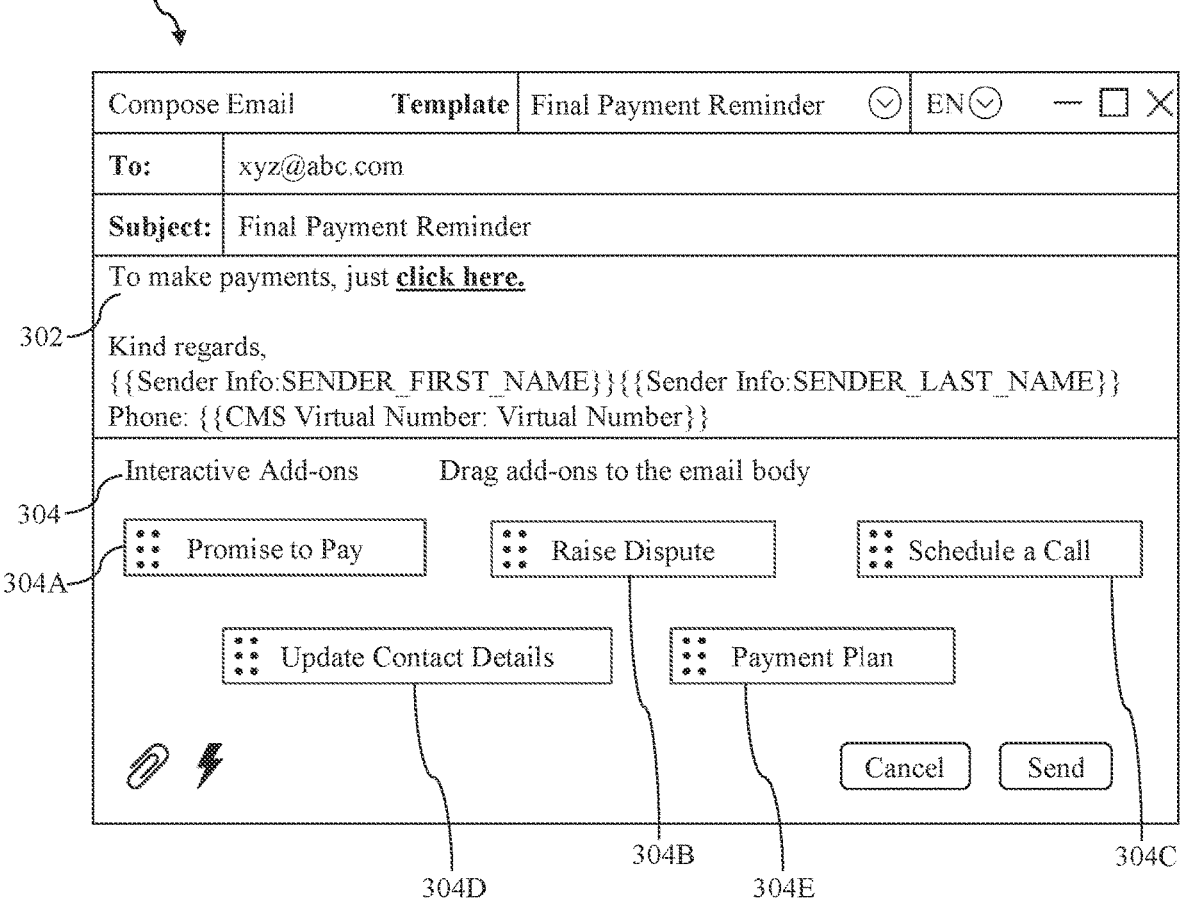
FIG. 3 is an exemplary view of a user interface depicting sending of the one or more interactive actionable electronic mails, in accordance with an embodiment of the present disclosure.

FIG. 3 is an exemplary view of a user interface 300 depicting sending of the one or more interactive actionable electronic mails 302, in accordance with an embodiment of the present disclosure. The user interface 300, in FIG. 3, depicts the one or more electronic mail wrappers (e.g., one or more interactive add-ons) 304 including at least one of: the one or more promise to pay wrappers 304A, the one or more dispute wrappers 304B, the one or more call schedule wrappers 304C, the one or more contact update wrappers 304D, and the one or more payment plan wrappers 304E. Further, the user interface 300 depicts that the one or more electronic mail wrappers 304 may be dragged and dropped to generate the one or more actionable interactive electronic mails 302.

Figure 4B:
FIG. 4B is an exemplary view of a user interface depicting generation of one or more electronic mail wrappers (e.g., promise to pay) within the one or more interactive actionable electronic mails, in accordance with an embodiment of the present disclosure.
Figure 4C:
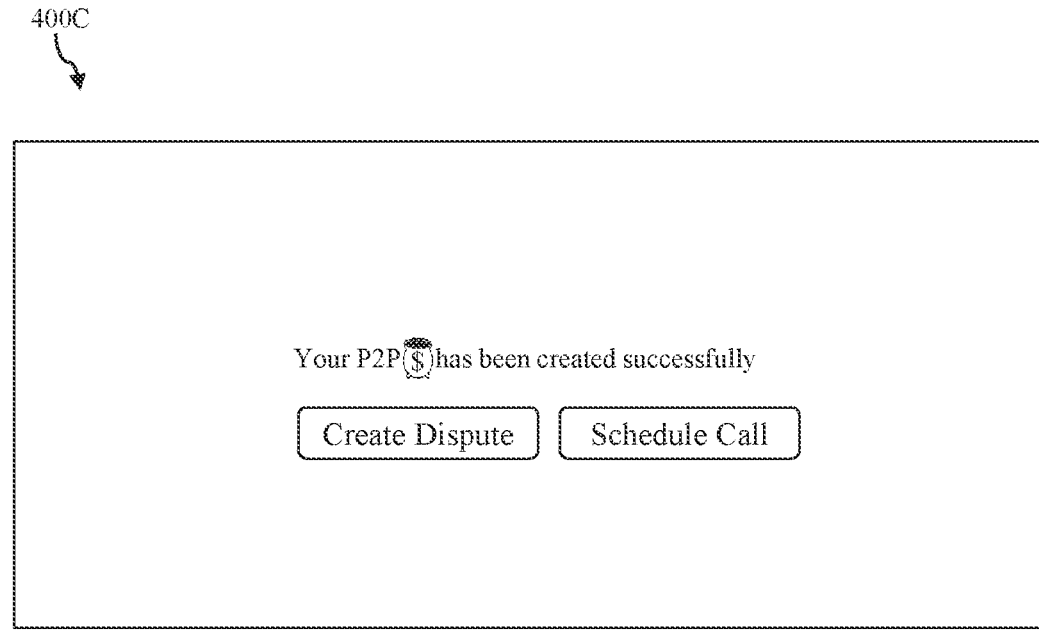
FIG. 4C is an exemplary view of a user interface depicting a notification that is received upon generation of the one or more electronic mail wrappers, in accordance with an embodiment of the present disclosure.

FIG. 4A is an exemplary view of a user interface 400A depicting that the one or more second users receive the one or more interactive actionable electronic mails 302, in accordance with an embodiment of the present disclosure. FIG. 4B is an exemplary view of a user interface 400B depicting the generation of one or more electronic mail wrappers (e.g., the promise to pay action 402) within the one or more interactive actionable electronic mails 302, in accordance with an embodiment of the present disclosure. FIG. 4C is an exemplary view of a user interface 400C depicting a notification that is received upon generation of the one or more electronic mail wrappers, in accordance with an embodiment of the present disclosure.

Figure 5A:
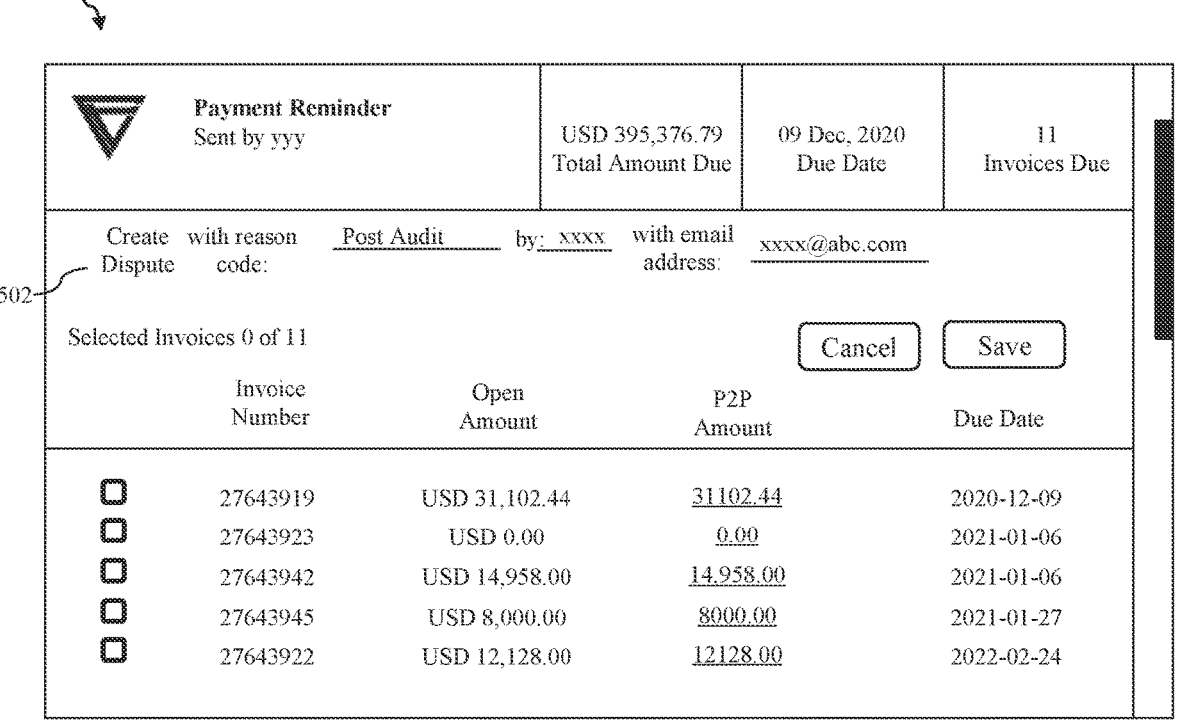
FIG. 5A is an exemplary view of a user interface depicting generation of the one or more electronic mail wrappers (e.g., dispute action) within the one or more interactive actionable electronic mails, in accordance with an embodiment of the present disclosure.
Figure 5B:
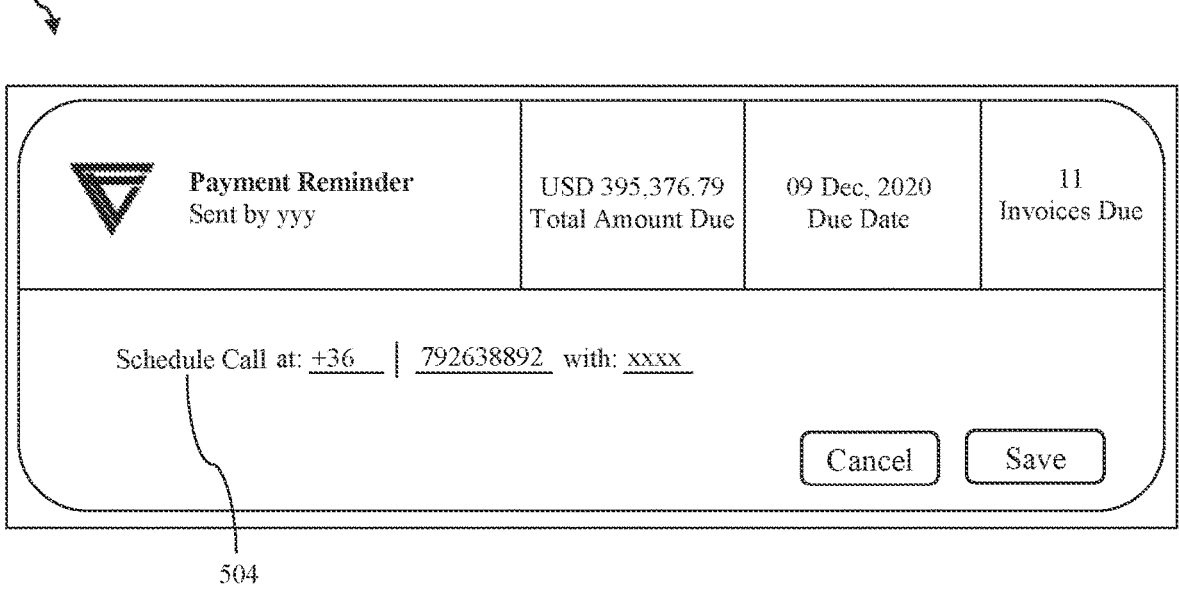
FIG. 5B is an exemplary view of a user interface depicting generation of the one or more electronic mail wrappers (e.g., scheduling a call action) within the one or more interactive actionable electronic mails, in accordance with an embodiment of the present disclosure.

FIG. SA is an exemplary view of a user interface 500A depicting the generation of the one or more electronic mail wrappers (e.g., a dispute action 502) within the one or more interactive actionable electronic mails 302, in accordance with an embodiment of the present disclosure. FIG. 5B is an exemplary view of a user interface 500B depicting the generation of the one or more electronic mail wrappers (e.g., scheduling a call action 504) within the one or more interactive actionable electronic mails 302, in accordance with an embodiment of the present disclosure.

FIG. 6 is a flow chart illustrating a computer-implemented method 600 for generating the one or more interactive actionable electronic mails, in accordance with an embodiment of the present disclosure. At step 602, the one or more first inputs are received from the one or more first electronic devices 102 associated with the one or more first users. In an embodiment, the one or more first inputs may include the one or more first information related to at least one of: the one or more electronic mail identities of the one or more entities associated with the one or more second users, the one or more types of electronic mail wrappers required to be generated, and the one or more payment details of the one or more entities associated with the one or more second users.

At step 604, the one or more types of electronic mail wrappers are determined based on the one or more first inputs received from the one or more first electronic devices 102 associated with the one or more first users. At step 606, the one or more electronic mail wrappers are generated based on at least one of: the one or more accelerated mobile pages (AMP) for one or more electronic mails, the one or more adaptive cards, and the one or more hypertext markup language (HTML) frameworks. In an embodiment, the one or more electronic mail wrappers may include at least one of: the one or more promise to pay wrappers, the one or more dispute wrappers, the one or more call schedule wrappers, the one or more contact update wrappers, and the one or more payment plan wrappers.

At step 608, the one or more interactive actionable electronic mails including the one or more electronic mail wrappers are sent based on the one or more cloud-based electronic mail sending services supporting the one or more first protocols.

At step 610, the output of the one or more interactive actionable electronic mails with the one or more electronic mail wrappers, is provided to the one or more first users on the one or more user interfaces associated with the one or more first electronic devices 102.

At step 612, the one or more databases 108 are updated in real-time based on the one or more second inputs, in response to the one or more interactive actionable electronic mails with the generated one or more electronic mail wrappers, received from the one or more second electronic devices associated with the one or more second users. In FIG. 6, the circular symbol with "A" written inside is being used as an off-page connector. This is used for indicating that FIG. 6 continues in the next page.

The present invention has the following advantages. The present invention with the computer-implemented system 104 is configured to generate the one or more interactive actionable electronic mails that allow the one or more second users to perform many actions related to accounts receivables within the electronic mail body. The one or more interactive actionable electronic mails may provide a better user experience, higher engagement, and more conversions for one or more businesses.

Further, the one or more interactive actionable electronic mails at the hardware level is that the one or more interactive actionable electronic mails may reduce the load on the server and the network 106. This is because the one or more interactive actionable electronic mails may process some of the user inputs and logic within the one or more electronic mail clients, without requiring a round trip to the server. For example, if one or more second users fill out a dispute action in an interactive electronic mail, the electronic mail client may validate the input and display the results without sending any data to the server, which may save bandwidth and improve the performance of the electronic mail service.

Further, the one or more interactive actionable electronic mails at the hardware level is that the one or more interactive actionable electronic mails may enhance the security and privacy of the user data. This is because the one or more interactive actionable electronic mails may encrypt and authenticate the user input and output within the one or more electronic mail clients, without exposing any sensitive information to the server or third parties. For example, if the one or more second users make a payment in an interactive email, the electronic mail client may use the interactive actionable email to securely process the payment, without revealing any personal or financial details to the server, which may prevent data breaches and frauds.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the computer-implemented system 104 either directly or through intervening I/O controllers. Network adapters may also be coupled to the computer-implemented system 104 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer-implemented system 104 in accordance with the embodiments herein. The computer-implemented system 104 herein comprises at least one processor or central processing unit (CPU). The CPUs are interconnected via the system bus 208 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the computer-implemented system 104. The computer-implemented system 104 can read the inventive instructions on the program storage devices and follow these instructions to execute the methodology of the embodiments herein.

The computer-implemented system 104 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having." "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A computer-implemented method for generating one or more interactive actionable electronic mails, the computer-implemented method comprising:

receiving, by one or more hardware processors, one or more first inputs from one or more first electronic devices associated with one or more first users, wherein the one or more first inputs comprise one or more first information related to one or more electronic mail identities of one or more entities associated with one or more second users, and one or more types of a plurality of types of electronic mail wrappers to be generated, wherein the plurality of types of electronic mail wrappers comprises one or more accelerated mobile pages (AMP) for one or more electronic mails, one or more adaptive cards, and one or more hypertext markup language (HTML) frameworks;

determining, by the one or more hardware processors, the one or more types of electronic mail wrappers based on the one or more first inputs received from the one or more first electronic devices associated with the one or more first users;

generating, by the one or more hardware processors, the one or more types of electronic mail wrappers based on at least one of: the one or more accelerated mobile pages (AMP) for the one or more electronic mails, the one or more adaptive cards, and the one or more hypertext markup language (HTML) frameworks, sending, by the one or more hardware processors, the one or more interactive actionable electronic mails comprising the one or more types of electronic mail wrappers based on one or more cloud-based electronic mail sending services supporting one or more first protocols;

providing, by the one or more hardware processors, an output of the one or more interactive actionable electronic mails with the one or more types of electronic mail wrappers, to the one or more first users on one or more user interfaces associated with the one or more first electronic devices;

updating, by the one or more hardware processors, one or more databases in real-time based on one or more second inputs, in response to the one or more interactive actionable electronic mails with the generated one or more types of electronic mail wrappers, received from one or more second electronic devices associated with the one or more second users;

converting, by the one or more hardware processors, one or more electronic mail codes into one or more visual formats to be displayed on one or more electronic mail clients, configured in at least one of: the one or more first electronic devices associated with the one or more first users, and one or more second electronic devices associated with the one or more second users;

determining, by the one or more hardware processors, whether at least one of: the one or more accelerated mobile pages (AMP) for the one or more electronic mails, one or more adaptive cards, and one or more hypertext markup language (HTML) frameworks, are configured in the one or more electronic mail clients; and rendering, by the one or more hardware processors, the one or more electronic mails from one or more servers based on the configuration of at least one of: the one or more accelerated mobile pages (AMP) for one or more electronic mails, one or more adaptive cards, and one or more hypertext markup language (HTML) frameworks, determined in the one or more electronic mail clients, wherein the one or more electronic mails are retrieved from the one or more servers by one or more second protocols.

2. The computer-implemented method of claim 1, wherein generating, by the one or more hardware processors, the one or more types of electronic mail wrappers based on the one or more accelerated mobile pages (AMP) for one or more electronic mails comprises:

creating, by the one or more hardware processors, the one or more interactive actionable electronic mails to be updated in real-time; and providing, by the one or more hardware processors, one or more applications related functionalities within the one or more interactive actionable electronic mails based on the one or more accelerated mobile pages (AMP), wherein the one or more accelerated mobile pages (AMP) is generated by:

generating, by the one or more hardware processors, one or more hypertext markup language (HTML) documents, with one or more accelerated mobile pages (AMP) boilerplates;

creating, by the one or more hardware processors, the one or more hypertext markup language (HTML) documents as one or more accelerated mobile pages (AMP) based electronic mails;

setting, by the one or more hardware processors, one or more responsive and dynamic layouts of the accelerated mobile pages (AMP) based electronic mails by adding one or more first accelerated mobile pages (AMP) components;

configuring, by the one or more hardware processors, one or more cascading style sheets (CSS) within one or more accelerated mobile pages (AMP); and utilizing, by the one or more hardware processors, one or more second accelerated mobile pages (AMP) components comprising at least one of: data binding components and one or more option selection components.

3. The computer-implemented method of claim 1, wherein generating, by the one or more hardware processors, the one or more types of electronic mail wrappers based on the one or more adaptive cards comprises:

generating, by the one or more hardware processors, at least one of: one or more content specifications and one or more layout specifications, wherein the one or more content specifications comprise at least one of: one or more texts, one or more images, and one or more multimedia contents, and wherein the one or more layout specifications comprise at least one of: one or more arrangements and one or more styles, of the one or more content specifications within the one or more types of electronic mail wrappers;

generating, by the one or more hardware processors, one or more file formats in compliance with one or more adaptive card structures by processing one or more input data associated with at least one of: the one or more content specifications and the one or more layout specifications;

structuring, by the one or more hardware processors, the one or more file formats to encapsulate one or more elements of the one or more types of electronic mail wrappers, wherein the one or more elements of the one or more types of electronic mail wrappers comprise at least one of: one or more headers, one or more bodies, and one or more actions, wherein the one or more headers comprise at least one of: one or more second information associated with the one or more first users and one or more subjects of the one or more electronic mails, wherein the one or more bodies comprise one or more contents of the one or more electronic mails formatted according to the one or more adaptive card structures, and wherein the one or more actions comprise one or more user-triggered events comprising at least one of: clicking of one or more first buttons and submission of one or more first forms; and converting, by the one or more hardware processors, the one or more file formats into the one or more types of electronic mail wrappers to be rendered by processing the one or more adaptive card structures based on one or more rendering engines.

4. The computer-implemented method of claim 1, wherein generating, by the one or more hardware processors, the one or more types of electronic mail wrappers based on the one or more hypertext markup language (HTML) frameworks comprises:

creating, by the one or more hardware processors, one or more hypertext markup language (HTML) contents based on a hypertext markup language (HTML) generation subsystem; and setting, by the one or more hardware processors, one or more interactive elements comprising one or more second buttons, one or more second forms, and one or more user interface components, within one or more hypertext markup language (HTML) structures, wherein the one or more interactive elements are associated with one or more predefined actions by setting at least one of: one or more script languages and one or more metadata within one or more hypertext markup language (HTML) codes, and wherein the one or more predefined actions comprise at least one of: retrieving of one or more data, submission of the one or more second forms, and triggering of external system requests.

5. The computer-implemented method of claim 1, further comprising:

generating, by the one or more hardware processors, one or more composite electronic mail wrappers by combining two of the one or more types of electronic mail wrappers generated from at least one of: the one or more accelerated mobile pages (AMP) for one or more electronic mails, the one or more adaptive cards, and the one or more hypertext markup language (HTML) frameworks; and controlling, by the one or more hardware processors, the one or more composite electronic mail wrappers to be displayed across one or more platforms by one or more parameter-driven rules based on one or more factors comprising at least one of: nature of the one or more contents of the one or more electronic mails, one or more preferences of at least one of: the one or more first users and the one or more second users, and one or more capabilities of at least one of: the one or more first electronic devices and the one or more second electronic devices.

6. The computer-implemented method of claim 1, wherein the one or more first protocols comprise at least one of: one or more Simple Mail Transfer Protocols (SMTP), one or more Extended Simple Mail Transfer Protocols (ESMTP), and one or more Simple Mail Transfer Protocols Secure (SMTPS).

7. The computer-implemented method of claim 1, wherein the one or more second protocols comprise at least one of: one or more Post Office Protocols version 3 (POP3), one or more Internet Message Access Protocols (IMAP), one or more Exchange ActiveSync, the one or more Simple Mail Transfer Protocols (SMTP), one or more Internet Message Access Protocol version 4 (IMAP4rev1), one or more Mail Access Protocols (MAP), the one or more Extended Simple Mail Transfer Protocols (ESMTP), one or more Hypertext Transfer Protocols (HTTP), and Hypertext Transfer Protocols Secure (HTTPS).

8. The computer-implemented method of claim 1, wherein the one or more types of electronic mail wrappers comprise at least one of: one or more promise to pay wrappers, one or more dispute wrappers, one or more call schedule wrappers, one or more contact update wrappers, and one or more payment plan wrappers.

9. A computer-implemented system for generating one or more interactive actionable electronic mails, the computer-implemented system comprising:

one or more hardware processors;

a memory coupled to the one or more hardware processors, wherein the memory comprises a plurality of subsystems in form of programmable instructions executable by the one or more hardware processors, and wherein the plurality of subsystems comprises:

an input receiving subsystem configured to receive one or more first inputs from one or more first electronic devices associated with one or more first users, wherein the one or more first inputs comprise one or more first information related to one or more electronic mail identities of one or more entities associated with one or more second users, one or more types of a plurality of types of electronic mail wrappers required to be generated, and one or more payment details of the one or more entities associated with the one or more second users, wherein the plurality of types of electronic mail wrappers comprises one or more accelerated mobile pages (AMP) for one or more electronic mails, one or more adaptive cards, and one or more hypertext markup language (HTML) frameworks;

an electronic mail wrapper generation subsystem configured to:

determine the one or more types of electronic mail wrappers based on the one or more first inputs received from the one or more first electronic devices associated with the one or more first users; and generate the one or more types of electronic mail wrappers based on at least one of: the one or more accelerated mobile pages (AMP) for the one or more electronic mails, the one or more adaptive cards, and the one or more hypertext markup language (HTML) frameworks, an electronic mail sending subsystem configured to send the one or more interactive actionable electronic mails comprising the one or more types of electronic mail wrappers based on one or more cloud-based electronic mail sending services supporting one or more first protocols;

an output subsystem configured to provide an output of the one or more interactive actionable electronic mails with the one or more types of electronic mail wrappers, to the one or more first users on one or more user interfaces associated with the one or more first electronic devices; and a database updating subsystem configured to update one or more databases in real-time based on one or more second inputs, in response to the one or more interactive actionable electronic mails with the generated one or more types of electronic mail wrappers, received from one or more second electronic devices associated with the one or more second users; and an electronic mail rendering subsystem configured to:

convert one or more electronic mail codes into one or more visual formats to be displayed on one or more electronic mail clients, configured in at least one of: the one or more first electronic devices associated with the one or more first users, and one or more second electronic devices associated with the one or more second users;

determine whether at least one of: the one or more accelerated mobile pages (AMP) for the one or more electronic mails, one or more adaptive cards, and one or more hypertext markup language (HTML) frameworks, are configured in the one or more electronic mail clients; and render the one or more electronic mails from one or more servers based on the configuration of at least one of: the one or more accelerated mobile pages (AMP) for one or more electronic mails, one or more adaptive cards, and one or more hypertext markup language (HTML) frameworks, determined in the one or more electronic mail clients, wherein the one or more electronic mails are rendered from the one or more servers by one or more second protocols.

10. The computer-implemented system of claim 9, wherein in generating the one or more types of electronic mail wrappers based on the one or more accelerated mobile pages (AMP) for one or more electronic mails, the electronic mail wrapper generation subsystem is configured to:

create the one or more interactive actionable electronic mails to be updated in real-time; and provide one or more applications related functionalities within the one or more interactive actionable electronic mails based on the one or more accelerated mobile pages (AMP), wherein the one or more accelerated mobile pages (AMP) is generated by:

generating one or more hypertext markup language (HTML) documents, with one or more accelerated mobile pages (AMP) boilerplates;

creating the one or more hypertext markup language (HTML) documents as one or more accelerated mobile pages (AMP) based electronic mails;

setting one or more responsive and dynamic layouts of the accelerated mobile pages (AMP) based electronic mails by adding one or more first accelerated mobile pages (AMP) components;

configuring one or more cascading style sheets (CSS) within one or more accelerated mobile pages (AMP); and utilizing one or more second accelerated mobile pages (AMP) components comprising at least one of: data binding components and one or more option selection components.

11. The computer-implemented system of claim 9, wherein in generating the one or more types of electronic mail wrappers based on the one or more adaptive cards, the electronic mail wrapper generation subsystem is configured to:

generate at least one of: one or more content specifications and one or more layout specifications, wherein the one or more content specifications comprise at least one of: one or more texts, one or more images, and one or more multimedia contents, and wherein the one or more layout specifications comprise at least one of: one or more arrangements and one or more styles, of the one or more content specifications within the one or more types of electronic mail wrappers;

generate one or more file formats in compliance with one or more adaptive card structures by processing one or more input data associated with at least one of: the one or more content specifications and the one or more layout specifications;

structure the one or more file formats to encapsulate one or more elements of the one or more electronic mail wrappers, wherein the one or more elements of the one or more types of electronic mail wrappers comprise at least one of: one or more headers, one or more bodies, and one or more actions, wherein the one or more headers comprise at least one of: one or more second information associated with the one or more first users and one or more subjects of the one or more electronic mails, wherein the one or more bodies comprise one or more contents of the one or more electronic mails formatted according to the one or more adaptive card structures, and wherein the one or more actions comprise one or more user-triggered events comprising at least one of: clicking of one or more first buttons and submission of one or more first forms; and convert the one or more file formats into the one or more types of electronic mail wrappers to be rendered by processing the one or more adaptive card structures based on one or more rendering engines.

12. The computer-implemented system of claim 9, wherein in generating the one or more types of electronic mail wrappers based on the one or more hypertext markup language (HTML) frameworks, the electronic mail wrapper generation subsystem is configured to:

create one or more hypertext markup language (HTML) contents based on a hypertext markup language (HTML) generation subsystem; and set one or more interactive elements comprising one or more second buttons, one or more second forms, and one or more user interface components, within one or more hypertext markup language (HTML) structures, wherein the one or more interactive elements are associated with one or more predefined actions by setting at least one of: one or more script languages and one or more metadata within one or more hypertext markup language (HTML) codes, and wherein the one or more predefined actions comprise at least one of: retrieving of one or more data, submission of the one or more second forms, and triggering of external system requests.

13. The computer-implemented system of claim 9, wherein the electronic mail wrapper generation subsystem is further configured to:

generate one or more composite electronic mail wrappers by combining two of the one or more types of electronic mail wrappers generated from at least one of: the one or more accelerated mobile pages (AMP) for one or more electronic mails, the one or more adaptive cards, and the one or more hypertext markup language (HTML) frameworks; and control the one or more composite electronic mail wrappers to be displayed across one or more platforms by one or more parameter-driven rules based on one or more factors comprising at least one of: nature of the one or more contents of the one or more electronic mails, one or more preferences of at least one of: the one or more first users and the one or more second users, and one or more capabilities of at least one of: the one or more first electronic devices and the one or more second electronic devices.

14. The computer-implemented system of claim 9, wherein the one or more first protocols comprise at least one of: one or more Simple Mail Transfer Protocols (SMTP), one or more Extended Simple Mail Transfer Protocols (ESMTP), and one or more Simple Mail Transfer Protocols Secure (SMTPS).

15. The computer-implemented system of claim 9, wherein the one or more second protocols comprise at least one of: one or more Post Office Protocols version 3 (POP3), one or more Internet Message Access Protocols (IMAP), one or more Exchange ActiveSync, the one or more Simple Mail Transfer Protocols (SMTP), one or more Internet Message Access Protocol version 4 (IMAP4rev1), one or more Mail Access Protocols (MAP), the one or more Extended Simple Mail Transfer Protocols (ESMTP), one or more Hypertext Transfer Protocols (HTTP), and Hypertext Transfer Protocols Secure (HTTPS).

16. A non-transitory computer-readable storage medium having instructions stored therein that when executed by one or more hardware processors, cause the one or more hardware processors to execute operations of:

receiving one or more first inputs from one or more first electronic devices associated with one or more first users, wherein the one or more first inputs comprise one or more first information related to one or more electronic mail identities of one or more entities associated with one or more second users, one or more types of a plurality of types of electronic mail wrappers required to be generated, and one or more payment details of the one or more entities associated with the one or more second users, wherein the plurality of types of electronic mail wrappers comprises one or more accelerated mobile pages (AMP) for one or more electronic mails, one or more adaptive cards, and one or more hypertext markup language (HTML) frameworks;

determining the one or more types of electronic mail wrappers based on the one or more first inputs received from the one or more first electronic devices associated with the one or more first users;

generating the one or more types of electronic mail wrappers based on at least one of: one or more accelerated mobile pages (AMP) for one or more electronic mails, one or more adaptive cards, and one or more hypertext markup language (HTML) frameworks, sending the one or more interactive actionable electronic mails comprising the one or more types of electronic mail wrappers based on one or more cloud-based electronic mail sending services supporting one or more first protocols;

providing an output of the one or more interactive actionable electronic mails with the one or more types of electronic mail wrappers, to the one or more first users on one or more user interfaces associated with the one or more first electronic devices;

updating one or more databases in real-time based on one or more second inputs, in response to the one or more interactive actionable electronic mails with the generated one or more types of electronic mail wrappers, received from the one or more second users;

converting one or more electronic mail codes into one or more visual formats to be displayed on one or more electronic mail clients, configured in at least one of: the one or more first electronic devices associated with the one or more first users, and one or more second electronic devices associated with the one or more second users; and determining whether at least one of: the one or more accelerated mobile pages (AMP) for one or more electronic mails, one or more adaptive cards, and one or more hypertext markup language (HTML) frameworks, are configured in the one or more electronic mail clients; and retrieving the one or more electronic mails from one or more servers based on the configuration of at least one of: the one or more accelerated mobile pages (AMP) for one or more electronic mails, one or more adaptive cards, and one or more hypertext markup language (HTML) frameworks, determined in the one or more electronic mail clients, wherein the one or more electronic mails are retrieved from the one or more servers by one or more second protocols.

17. The non-transitory computer-readable storage medium of claim 16, further comprising:

generating one or more composite electronic mail wrappers by combining the one or more types of electronic mail wrappers generated from at least one of: the one or more accelerated mobile pages (AMP) for one or more electronic mails, the one or more adaptive cards, and the one or more hypertext markup language HTML) frameworks; and controlling the one or more composite electronic mail wrappers to be displayed across one or more platforms by one or more parameter-driven rules based on one or more factors comprising at least one of: nature of the one or more contents of the one or more types of electronic mails, one or more preferences of at least one of: the one or more first users and the one or more second users, and one or more capabilities of at least one of: the one or more first electronic devices and the one or more second electronic devices.

* * * * *